(12) United States Patent
Souschek et al.

(10) Patent No.: US 8,474,845 B2
(45) Date of Patent: Jul. 2, 2013

(54) WHEEL SUSPENSION

(75) Inventors: Rainer Souschek, Juelich (DE);
Wolfgang David, Aachen (DE); Michael Johannes Frantzen, Aachen (DE);
Edmund Halfmann, Neuss (DE);
Friedrich Peter Wolf-Monheim,
Aachen (DE)

(73) Assignee: Ford Global Technologies, LLC,
Dearborn, MI (US)

( * ) Notice: Subject to any disclaimer, the term of this patent is extended or adjusted under 35 U.S.C. 154(b) by 153 days.

(21) Appl. No.: 12/928,007

(22) Filed: Dec. 1, 2010

(65) Prior Publication Data
US 2011/0127747 A1 Jun. 2, 2011

(30) Foreign Application Priority Data
Dec. 2, 2009 (DE) .................. 10 2009 047 404

(51) Int. Cl.
*B60G 11/52* (2006.01)
*F16F 7/06* (2006.01)

(52) U.S. Cl.
USPC ............ 280/124.155; 188/321.11; 267/140.2; 267/141.7

(58) Field of Classification Search
USPC .......... 280/124.155; 188/321.11; 267/140.13, 267/140, 140.12, 140.2, 141, 141.1, 141.3, 267/141.7
See application file for complete search history.

(56) References Cited

U.S. PATENT DOCUMENTS

| | | | | |
|---|---|---|---|---|
| 4,733,855 A * | 3/1988 | Balczun et al. | ............... | 267/294 |
| 4,754,958 A * | 7/1988 | Markowski | ................... | 267/140 |
| 4,903,985 A * | 2/1990 | Muhr et al. | ............ | 280/124.145 |
| 4,958,849 A * | 9/1990 | Pinch et al. | ............ | 280/124.155 |
| 5,024,461 A * | 6/1991 | Miyakawa et al. | ....... | 267/140.13 |
| 5,205,545 A * | 4/1993 | Quast | ........................ | 267/140.13 |
| 5,338,055 A | 8/1994 | Mauz | ............................. | 280/668 |
| 5,467,971 A * | 11/1995 | Hurtubise et al. | ............. | 267/220 |
| 6,557,816 B2 * | 5/2003 | Yoshida | ........................ | 248/674 |
| 6,561,531 B2 * | 5/2003 | Kobayashi et al. | .... | 280/124.155 |
| 6,640,942 B2 * | 11/2003 | Wakita | ..................... | 188/321.11 |
| 6,988,718 B1 * | 1/2006 | Eulenbach et al. | ............. | 267/33 |
| 7,311,181 B2 * | 12/2007 | Germano et al. | ........ | 188/321.11 |
| 7,841,088 B2 * | 11/2010 | Ogura et al. | ................ | 29/896.91 |
| 8,382,078 B2 * | 2/2013 | Okada et al. | .................. | 267/140 |
| 2001/0017435 A1 * | 8/2001 | Yoshida | ................... | 267/140.11 |
| 2004/0168870 A1 * | 9/2004 | Handke et al. | ........... | 188/321.11 |
| 2007/0138719 A1 * | 6/2007 | Ichikawa et al. | ......... | 267/140.14 |
| 2007/0144849 A1 * | 6/2007 | Breun et al. | ............. | 188/321.11 |
| 2010/0327501 A1 * | 12/2010 | Neureder | ..................... | 267/141 |

FOREIGN PATENT DOCUMENTS

| | | |
|---|---|---|
| DE | 10 2004 003 132 | 1/2004 |
| DE | 10 2005 061 011 | 12/2005 |
| DE | 10 2006 005 102 | 2/2006 |

\* cited by examiner

*Primary Examiner* — Karen Beck
(74) *Attorney, Agent, or Firm* — L.C. Begin & Associates, PLLC

(57) ABSTRACT

The invention relates to a wheel suspension having a shock absorber (1) with a piston rod (2) and a spring element (7), the spring element (7) being mounted between a lower spring retaining plate (4) and an upper spring retaining plate (6) and the head of the shock absorber (1) being fastened to a vehicle body (8). An intermediate element system (9, 11, 12; 9, 26) is arranged and embodied between the upper spring retaining plate (6) and the vehicle body (8) in such a manner that a compensating moment (23) is generated during final installation of the shock absorber (1) on the vehicle body (8).

15 Claims, 2 Drawing Sheets

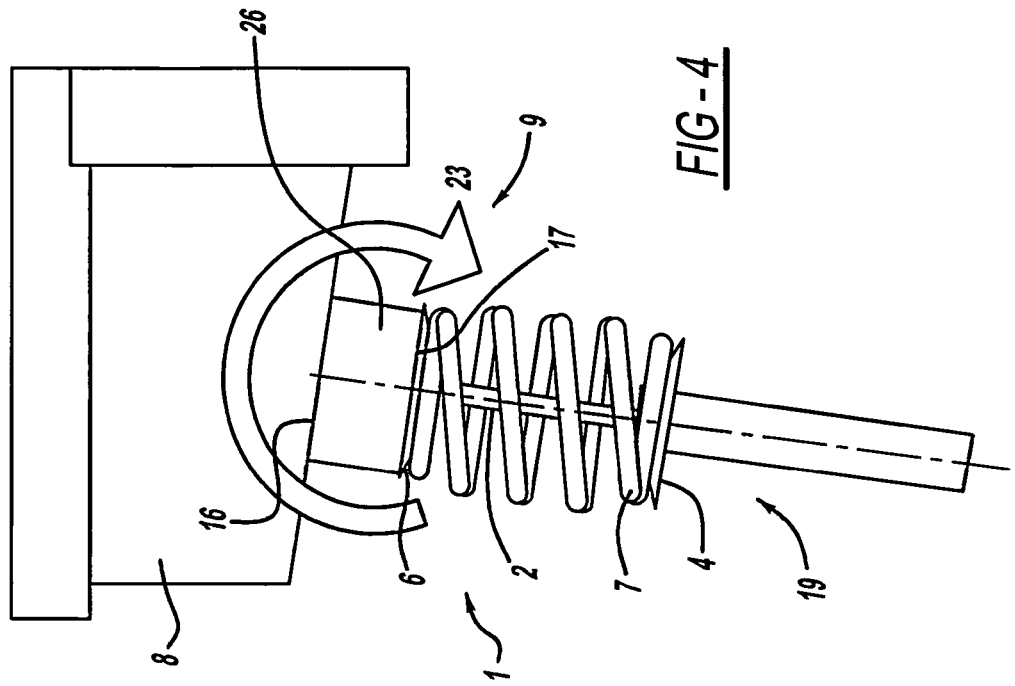
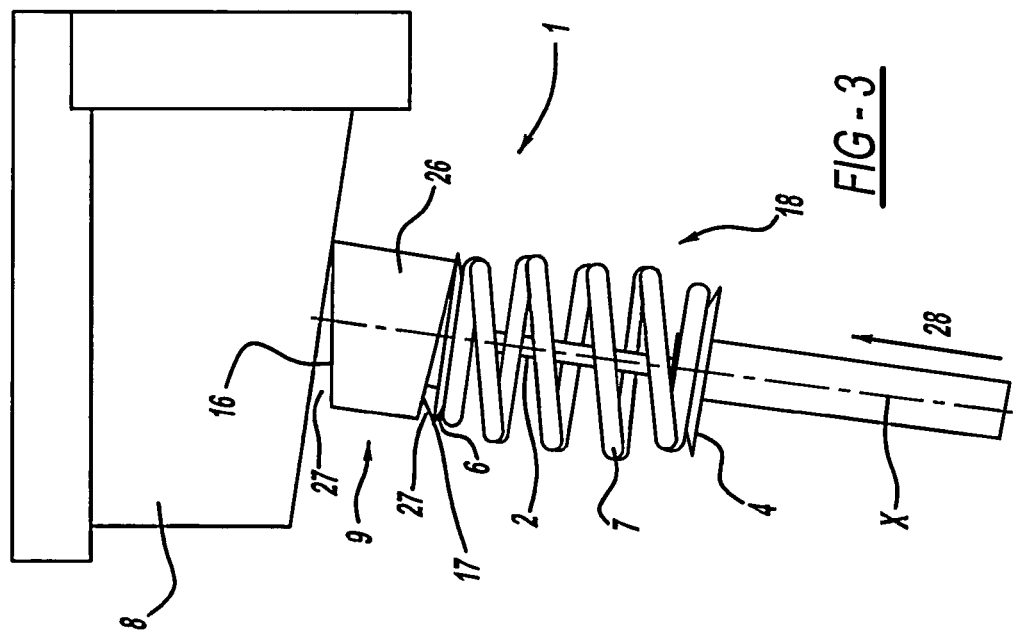

WHEEL SUSPENSION

BACKGROUND OF THE INVENTION

The invention relates to a wheel suspension having a shock absorber with a piston rod and a spring element, it being possible for the spring element to be mounted, for example, between a lower and an upper spring retaining plate and the head of the shock absorber being fastened to a vehicle body.

DE 1 505 616 discloses a device for rectilinear guidance of independently suspended wheels, consisting of a hydraulic shock absorber and a helical spring arranged coaxially therewith. The shock absorber is connected to the vehicle body in its upper region and is fastened rigidly to a wheel carrier in its lower region. The helical spring is arranged and configured in such a manner that, in the installed state, the half of the helical spring oriented towards the outside of the vehicle has a greater prestress than the half oriented towards the inside of the vehicle.

In DE 1 630 249 elastic mounts for an engine suspension are described.

An independent wheel suspension is disclosed in DE 41 00 296 C1. This suspension comprises an upright shock absorber, the piston rod of which is retained elastically in an upper guide joint fixed to the body. In the installed position the upper guide joint is prestressed about the articulation point in a transverse plane of the vehicle, in order to generate a torque which counteracts a bending moment acting on the shock absorber via the wheel carrier.

DE 102 59 093 A1 concerns a support bearing of a wheel suspension. A spring element has two elastomeric parts of different hardnesses. One of the elastomeric parts has a wedge-shaped receptacle for receiving the other elastomeric part, whereby a tilting moment which opposes a bending moment is to be generated.

GB 1,005,633 also concerns an independent wheel suspension in which the upper end of the piston rod of the shock absorber is fastened to the vehicle body via an elastic element installed under prestress.

DE 10 2004 003 132 A1 (=EP 1 564 037 B1) discloses a bearing for a damper element of a vehicle. An elastomeric element is received in a recess in a bearing plate. Prior to installation of the bearing plate on the body, the elastomeric element is soft and is retained substantially without prestress between cover and bearing plate. In the installed state the elastomeric element is retained under compression between cover and bearing plate, the cover being supported on the body.

In EP 0 218 824 B1 an elastic suspension for a motor vehicle wheel is described. A second elastomeric block is arranged between a lower surface of the chassis and a stop face of a stop element, the stop face lying in a plane substantially perpendicular to the longitudinal axis of the shock absorber.

DE 10 2005 061 011 A1 discloses a connecting bearing for a vibration damper, comprising a cup-shaped bearing housing in which is arranged a disk-shaped transmission element fastened to the vibration damper and having parallel upper and lower surfaces, above and below which respective elastomeric bodies are arranged, a compensation element compensating an angular offset between the vibration damper and a connecting surface of the connecting bearing. The compensation element is arranged between at least one of the elastomeric bodies and the transmission element.

DE 10 2006 005 102 B3 discloses a suspension strut with adjustable spring retaining plate. An adjusting cylinder is supported on a bearing head which is connected to a vehicle body via an annular elastomeric intermediate body with a fastening flange. The piston rod has an elastic joint connection, the spring rate of which is lower than that of the elastomeric intermediate body. The elastic joint connection bears axially against the fastening flange. The elastic joint connection has on a support plate on the piston-rod side below the fastening flange at least one first resilient joint body and at least one second resilient joint body above the fastening flange.

Wheel suspensions comprising, for example, McPherson struts or double transverse arm systems can be subject to a bending moment acting on the shock absorber, which can be generated by external loads, such as road surface loads, or by internal loads generated, for example, by other suspension elements. In the case of McPherson suspensions the bending moments acting on the shock absorber can be compensated, for example, by the position of the line of action of a helical spring. However, this can lead to considerable problems regarding installation space, for example in relation to enlarged wheels or tires.

SUMMARY OF THE INVENTION

It is therefore the object of the invention to improve a wheel suspension of the type mentioned in the introduction with simple means in such a manner that McPherson wheel suspensions, for example, have advantages regarding installation space, considerable economies being achievable at the same time, in particular as a result of a simpler configuration of the spring element.

This object is achieved according to the invention with a wheel suspension having the features of claim 1, an intermediate element system being arranged and embodied between the upper spring retaining plate or the shock absorber itself and the vehicle-side attachment of the shock absorber to the vehicle body, in such a manner that a compensating moment is generated during installation of the shock absorber on the vehicle body.

The invention makes available a wheel suspension, for example a McPherson wheel suspension, which influences a shock absorber prestress and generates an internal moment between the vehicle body and the spring element and/or the shock absorber, on the front or rear axle of the vehicle. In this case the prestress is generated during assembly or during the installation of the damper strut or of the shock absorber. Ideally, the amount of the internal moment compensates the bending moment of the shock absorber for certain types of loading, it being possible for the amount of the internal moment to be adapted to this certain type of loading. In the case of McPherson wheel suspensions, the inventive solution results in advantages with regard to installation space, since the configuration of the spring element or of the helical spring is simpler, without the use of special measures. For example, a specially installed helical spring which in the installed state has a greater prestress on a half of the helical spring oriented, for example, towards the outside of the vehicle than on the half oriented towards the inside of the vehicle can be dispensed with. With the invention, an angled arrangement of the center line of the helical spring with respect to the center line of the shock absorber can be dispensed with. The helical spring can therefore be configured and produced more cost-effectively, since material savings are also possible.

It is advantageous within the meaning of the invention if the intermediate element system includes at least one rubber bearing. The rubber bearing is advantageously configured with a preferably central opening through which fastening elements arranged on the shock absorber can pass, the fastening elements serving for attachment to the vehicle body.

In a first preferred configuration, the intermediate element system includes, in addition to the rubber bearing, a wedge-shaped abutment element which is arranged on the vehicle body. The wedge-shaped abutment element may also be integrated directly in the vehicle body. The abutment element has an abutment surface oriented towards the rubber bearing, a fastening surface which rests against the vehicle body being provided opposite thereto. In a preferred configuration the abutment surface is configured with a larger angle of inclination, in relation to the fastening surface.

In the first preferred configuration, the rubber bearing, viewed in cross section, is in the form of a uniform cylindrical body, and is therefore symmetrical, which cylindrical body has, in a pre-installation position, two end faces disposed parallel to one another. One of the end faces, which may also be referred to as the abutment end face, is placed against the abutment surface in the pre-installation position. The second end face located opposite thereto rests, for example, against the upper spring retaining plate. In the pre-installation position the upper spring retaining plate, or another abutment surface on the damper, is arranged parallel to the abutment surface of the wedge-shaped abutment element. In the pre-installation position the rubber bearing is in contact on the one hand, via its abutment end face, with the abutment surface of the abutment element, and on the other hand is in contact via its other abutment surface with the upper spring retaining plate or another abutment surface on the damper. In the pre-installation position the center line of the shock absorber is arranged at an angle to the center line of a final installation position.

In order to generate a compensating moment or prestress, the shock absorber is moved from the pre-installation position to its final installation position. This is effected preferably by rotating or swiveling the shock absorber from the pre-installation position to the final installation position about the point of intersection of the damper center line with the upper spring retaining plate. The rubber bearing is thereby compressed on one side, viewed in cross section, so that the rubber bearing has a quasi-asymmetrical configuration in the final installation position, with regard to its opposite end faces. The rubber bearing is strongly compressed on one vertical side while the opposite vertical side is in a quasi-elongated state. In the assembled position the rubber bearing has a configuration, viewed in cross section, similar to or preferably like an equilateral trapezium.

In a further preferred configuration, there is provided an intermediate element system which, dispensing with a preferably separate abutment element, has an asymmetrically configured rubber bearing, viewed in cross section. In the pre-installation position said rubber bearing has a configuration, viewed in cross section, similar to or preferably like an equilateral trapezium. This means that the abutment end face of the rubber bearing is disposed in the opposite direction to the inclination of the side located opposite thereto. The rubber bearing is arranged between the upper spring retaining plate, or another abutment surface of the damper, and the vehicle-side attachment or the vehicle body. In the pre-installation position the shock absorber is arranged with its center line in its final installation position relative to the vehicle body. In the pre-installation position of the shock absorber, the upper spring retaining plate, or the upper abutment surface of the damper, is disposed substantially parallel to the vehicle body. Both end faces of the rubber bearing are inclined with respect to the upper spring retaining plate, that is, are disposed at an angle thereto.

In order to generate a compensating moment or a prestress, the shock absorber is moved from the pre-installation position to its final installation position. This is preferably effected by a compression of the rubber bearing acting in the axial direction, that is, by a linear movement of the upper spring retaining plate, or of the upper abutment surface of the damper, along the center line of the shock absorber in the direction of the vehicle body. The initially asymmetrical rubber bearing is thereby changed to a symmetrical form. In the final installation position the center line has not changed its position in relation to the pre-installation position. The rubber bearing is compressed in such a manner that its underside is disposed parallel to the upper spring retaining plate or to another abutment surface of the damper, the abutment side of the rubber bearing being disposed parallel to the underside. In the final position the rubber bearing, viewed in cross section, has a cylindrical and therefore symmetrical configuration. The compression of the rubber bearing, acting in a linear direction, produces internal stresses in the rubber bearing and therefore a prestressing moment of the shock absorber or of its piston rod.

Further advantageous configurations are disclosed in the dependent claims and in the following process description.

BRIEF DESCRIPTION OF THE DRAWINGS

In the drawings:

FIG. 3 shows a shock absorber in a pre-installation position as a detail with an intermediate element system in a second configuration, and FIG. 4 shows the shock absorber from FIG. 3 in its final installation position.

DETAILED DESCRIPTION

Figure 2:
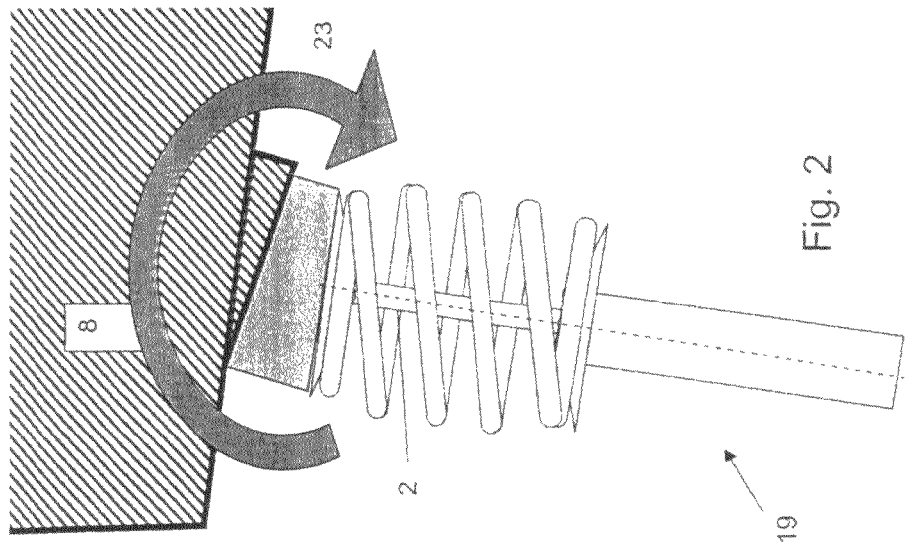
FIG. 2 shows the shock absorber from FIG. 1 in its final installation position.

In the different figures, identical parts are always provided with the same reference numerals, so that as a rule these parts are described only once.

Figure 1:
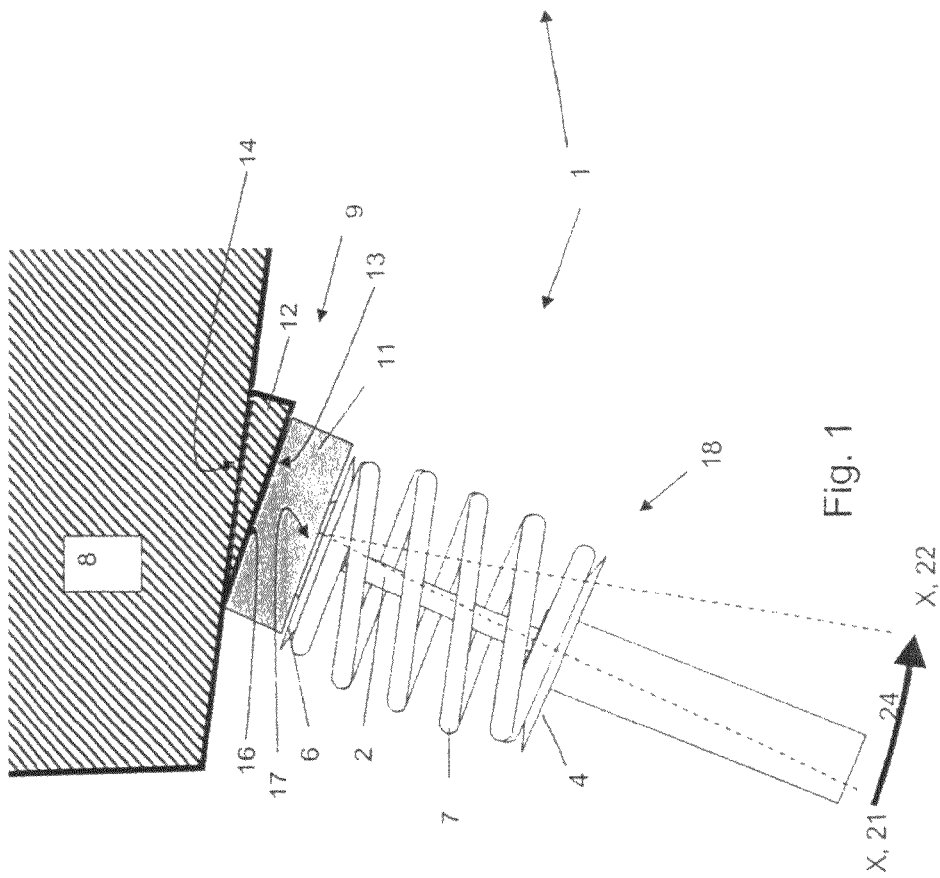
FIG. 1 shows a shock absorber in a pre-installation position as a detail with an intermediate element system in a first configuration.

FIG. 1 shows a section of a wheel suspension with a shock absorber 1 or with a McPherson strut 1. Further elements of the wheel suspension have been omitted from the representation.

The shock absorber 1 has a piston rod 2. The shock absorber 1 has, in the drawing plane, a lower spring retaining plate 4 and an upper spring retaining plate 6. A spring element 7, in the form of a helical spring 7 in the exemplary embodiment, is arranged between the two spring retaining plates 4, 6. The end of the piston rod 2 is connected to the upper spring retaining plate 6. The head of the shock absorber 1 is connectable to a vehicle body 8.

An intermediate element system 9 is arranged between the upper spring retaining plate 6 and the vehicle body 8.

In the exemplary embodiment represented by way of example in FIGS. 1 and 2, the intermediate element system 9 comprises a rubber bearing 11 and a wedge-shaped abutment element 12.

The abutment element 12 has an abutment surface 13 oriented towards the rubber bearing 11 and a fastening surface 14 arranged opposite thereto, with which the abutment element 12 is connected to the vehicle body 8. The abutment surface 13 is configured to be inclined from the top left side, in the drawing plane, in the direction of the bottom right side, and in effect represents an oblique plane. An abutment element 12 separate from the vehicle body, or a correspondingly oblique plane formed integrally on the vehicle body 8, may therefore be provided.

Viewed in cross section, the rubber bearing 11 is configured as a symmetrical cylindrical body with opposite end faces 16 and 17. The end face 16 may also be referred to as the abutment end face 16 and is placed against the abutment surface 13. The opposite, second end face 17, which may also be referred to as the underside 17, rests against the upper spring retaining plate 6.

Through-openings through which fastening and bearing elements can pass, with which elements the shock absorber 1 can be fastened to the vehicle body 8, may be arranged in the rubber bearing 11 and also in the abutment element 12.

FIG. 1 shows a pre-installation position 18 of the shock absorber 1 relative to the vehicle body 8. In the pre-installation position 18, a center line X of the shock absorber 1 is arranged at an angle in relation to its disposition in a final installation position 19 (FIG. 2). In FIG. 1 the disposition of the center line X in the pre-installation position is denoted by reference 21. For clarification, the disposition of the center line X in the final installation position 19 is denoted by reference 22.

The center line X intersects the upper spring retaining plate 6.

In order to generate a compensating moment 23 or a pre-stress, the shock absorber 1 is moved from the pre-installation position 18 to its final installation position 19. This is preferably effected by rotating or swiveling the shock absorber 1 from the pre-installation position 18 to the final installation position 19 about the point of intersection of the center line X with the upper spring retaining plate 6. This is represented in FIG. 1 by means of the arrow 24. The previously symmetrical rubber bearing 11 is thereby compressed on one side, viewed in cross section, so that in the final installation position 19 the rubber bearing 11 has a quasi-asymmetrical configuration with regard to its opposite end faces 16 and 17. On one vertical side the rubber bearing 11 is strongly compressed, while the opposite vertical side is in a quasi-elongated state. In the final installation position 19, the rubber bearing 11, viewed in cross section, has a configuration like an equilateral trapezium.

In the exemplary embodiment according to FIGS. 1 and 2, the compensating moment 23 is generated by rotating or swiveling the shock absorber 1 from its pre-installation position 18 to its final installation position 19. In this case the two installation surfaces (abutment surface 13, upper spring retaining plate 6) are initially arranged parallel to one another. In the final installation position 19 the two installation surfaces (abutment surface 13, upper spring retaining plate 6) are arranged obliquely with respect to one another.

In the exemplary embodiment represented in FIGS. 3 and 4, the intermediate element system 9 comprises a rubber bearing 26 the opposite end faces 16 and 17 of which are inclined in opposite directions with respect to one another, so that the rubber bearing 26, viewed in cross section, is configured, in effect, as an equilateral trapezium; that is, in the pre-installation position 18 it has an asymmetrical configuration. The two end faces 16 and 17 of the rubber bearing 26 therefore constitute the intermediate element system 9, it being possible to dispense with an oblique plane as described in relation to FIG. 1.

FIG. 3 shows the pre-installation position 18 of the shock absorber 1. In contrast to the exemplary embodiment according to FIG. 1, in the final installation position 19 (FIG. 4) the center line X of the shock absorber 1 is unchanged with respect to its disposition in the pre-installation position 18 (FIG. 3). The underside 17 of the rubber bearing 26 slopes relatively downwardly towards the upper spring retaining plate 6 and its abutment surface 16 slopes relatively upwardly towards the vehicle body 8. In the pre-installation position 18, a gap 27 which widens towards the left-hand side in the drawing plane is formed in each case between the corresponding abutment surfaces. The configuration of the widening gap 27 is directly dependent on the respective amount of inclination of the end faces 16 and 17 of the rubber bearing 26. The amount of inclination of each of the opposite end faces 16, 17 may be equal or different.

In order to generate a compensating moment 23 or a pre-stress, the shock absorber 1 is moved from the pre-installation position 18 (FIG. 3) to its final installation position 19 (FIG. 4). This is preferably effected by a compression of the rubber bearing 26 acting in the axial direction, that is, by a linear movement of the upper spring retaining plate 6 along the center line X of the shock absorber 1 in the direction of the vehicle body 8. This is represented in FIG. 3 by means of the arrow 28. The initially asymmetrical rubber bearing 26 is therefore transferred to a symmetrical form (FIG. 4). In the final installation position 19, the center line X has not changed its position in relation to the pre-installation position 18. The rubber bearing 26 is compressed in such a manner that its underside 17 is arranged parallel to the upper spring retaining plate 6, while the abutment side 16 of the rubber bearing 26 is disposed parallel to the plate side 17. The gaps 27 previously observable have been closed by the rubber bearing 26. In the final installation position 19 the rubber bearing 26 has a cylindrical configuration, viewed in cross section. The compression (arrow 28) of the rubber bearing 26 acting in a linear direction produces internal stresses in the rubber bearing 26, and therefore a prestressing moment of the shock absorber 1 or of its piston rod.

It will be understood that the foregoing descriptions of embodiments of the present invention are for illustrative purposes only. As such, the various structural and operational features herein disclosed are susceptible to a number of modifications commensurate with the abilities of one of ordinary skill in the art, none of which departs from the scope of the present invention as defined in the appended claims.

What is claimed is:

1. A wheel suspension having a shock absorber (1) with a piston rod (2) and a spring element (7), the spring element (7) being mounted between a lower spring retaining plate (4) and an upper spring retaining plate (6) and the head of the shock absorber (1) being fastened to a vehicle body (8), wherein an intermediate element system (9, 11, 12; 9, 26) is arranged and embodied between the upper spring retaining plate (6) and the vehicle body (8) in such a manner that a compensating moment (23) is generated during final installation of the shock absorber (1) on the vehicle body (8).

2. The wheel suspension as claimed in claim 1 wherein the intermediate element system (9, 11, 12; 9, 26) comprises at least one rubber bearing (11, 26).

3. The wheel suspension as claimed in claim 2 wherein the intermediate element system (9) comprises, in addition to the rubber bearing (11), a wedge-shaped abutment element (12) which has an abutment surface (13) oriented towards the rubber bearing (1) and a fastening surface (14) located opposite the abutment surface.

4. The wheel suspension as claimed in claim 2 wherein, in a pre-installation position (18), the rubber bearing (11) has two end faces (16, 17) disposed parallel to one another.

5. The wheel suspension as claimed in claim 2 wherein, in its pre-installation position (18), the rubber bearing (11) is configured as a largely symmetrical body and has a cylindrical configuration, viewed in cross section.

6. The wheel suspension as claimed in claim 2 wherein the shock absorber (1) is moved from its pre-installation position (18) to its final installation position (19) by rotating the shock absorber (1) about a point of intersection of a center line (X) of the shock absorber with the upper spring retaining plate (6).

7. The wheel suspension as claimed in claim 2 wherein, in its pre-installation position (18), the rubber bearing (26) has two end faces (16, 17), each of the end faces (16, 17) being disposed at an angle with respect to the upper spring retaining plate (6).

8. The wheel suspension as claimed in claim 7 wherein, in its pre-installation position (18), the shock absorber (1) is arranged with its center line (X) as in its final installation position (19).

9. The wheel suspension as claimed in claim 7 wherein the shock absorber (1) is configured to be transferable from its pre-installation position (18) to its final installation position (19) by a linear movement along its center line (X), wherein the rubber bearing (26) is configured to be compressed by transfer of the shock absorber from the pre-installation position (18) to its final installation position (19), and wherein the rubber bearing (26) has a symmetrical configuration in the final installation position (19).

10. The wheel suspension as claimed in claim 1 wherein the shock absorber 1 has a piston rod 2, the piston rod having a first end connected to the upper spring retaining plate (6), and a second end opposite the first end, the second end being operatively connectible to a vehicle wheel, and wherein the compensating moment is maintained by the intermediate element system prior to application of a force to the piston rod second end.

11. A wheel suspension comprising:
a shock absorber (1); and
means (9) operatively coupled to the shock absorber (1) for imparting a moment acting on the shock absorber (1) in a final installation position of the shock absorber.

12. The wheel suspension of claim 11 wherein the shock absorber (1) includes a piston rod (2) and a spring element (7), the spring element (7) being mounted between a lower spring retaining plate (4) and an upper spring retaining plate (6) and the head of the shock absorber (1) being fastened to a vehicle body (8), and wherein the moment imparting means (9) is positioned between the upper spring retaining plate (6) and the vehicle body (8).

13. The wheel suspension of claim 12 wherein the moment imparting means (9) comprises a wedge-shaped abutment element (12) connected to the vehicle body (8) and a rubber bearing (11) positioned between the abutment element (12) and the upper spring retaining plate (6).

14. The wheel suspension of claim 12 wherein the moment imparting means (9) comprises a rubber bearing (26) positioned between the vehicle body (8) and the upper spring retaining plate (6), the bearing having opposite end faces (16) and (17) of which are inclined in opposite directions with respect to one another.

15. The wheel suspension of claim 14 wherein the opposite end faces (16) and (17) are inclined in opposite directions with respect to one another such that the rubber bearing (26), viewed in cross section, is configured as a trapezium.

* * * * *